(12) United States Patent
Tharshanan et al.

(10) Patent No.: US 9,369,833 B2
(45) Date of Patent: Jun. 14, 2016

(54) TEXT MESSAGE LOCATION TRACKING USING COMET TRAIL REPRESENTING SPEED AND DIRECTION

(71) Applicants: Cellco Partnership, Basking Ridge, NJ (US); Verizon Patent and Licensing Inc., Basking Ridge, NJ (US)

(72) Inventors: Mahendra Tharshanan, San Ramon, CA (US); Amir Mayblum, Walnut Creek, CA (US); Jerry M. Kupsh, Concord, CA (US); Ian Lynn, Berkeley, CA (US); Kim M. Gutierrez, Alameda, CA (US); Eric Burns, San Francisco, CA (US); Ratna Desai, Oakland, CA (US); Kyle Hoyt, Pacifica, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 469 days.

(21) Appl. No.: 13/887,956

(22) Filed: May 6, 2013

(65) Prior Publication Data

US 2014/0329548 A1 Nov. 6, 2014

(51) Int. Cl.
*H04B 1/38* (2015.01)
*H04W 4/02* (2009.01)
*H04W 4/12* (2009.01)
*H04W 4/20* (2009.01)

(52) U.S. Cl.
CPC *H04W 4/02* (2013.01); *H04W 4/12* (2013.01); *H04W 4/206* (2013.01)

(58) Field of Classification Search
CPC .......................................................... H04B 1/38
USPC ........ 455/456.1, 456.2, 456.6, 457, 518, 524, 455/411, 412
See application file for complete search history.

(56) References Cited

U.S. PATENT DOCUMENTS 7,353,034 B2 * 4/2008 Haney ............... H04M 1/72519
  455/411
8,989,773 B2 * 3/2015 Sandel .................. H04W 4/028
  455/456.1

* cited by examiner

*Primary Examiner* — Charles Appiah
*Assistant Examiner* — Randy Peaches

(57) ABSTRACT

A first mobile device may receive, via a text messaging application, first location information from a second mobile device. The first location information may indicate a first geographic location of the second mobile device. The first mobile device may receive, via the text messaging application, second location information from the second mobile device. The second location information may indicate a second geographic location of the second mobile device. The first mobile device may generate, based on the first location information and the second location information, a graphical representation. The graphical representation may represent a movement of the second mobile device from the first geographic location to the second geographic location. The first mobile device may provide the graphical representation for display via a display associated with the first mobile device.

20 Claims, 12 Drawing Sheets

500

APPLICATION CONFIGURATION

SELECT AN USERNAME:

SELECT AN IMAGE:

BROWSE

SELECT INTERVAL FOR SENDING
LOCATION INFORMATION:

EVERY ▽    5 SECONDS ▽

OTHER

SELECT CONTACTS THAT LOCATION INFORMATION
SHOULD ALWAYS BE SHARED WITH:

SELECT CONTACT ▽

SELECT CONTACTS THAT LOCATION INFORMATION
SHOULD NEVER BE SHARED WITH:

SELECT CONTACT ▽

BACK    MORE CONFIGURATION    SUBMIT

TEXT MESSAGE LOCATION TRACKING USING COMET TRAIL REPRESENTING SPEED AND DIRECTION

BACKGROUND

Commonly, mobile devices include applications that allow users to exchange text-based messages, such as short message service ("SMS") messages and/or instant messages ("IMs") with other users.

BRIEF DESCRIPTION OF THE DRAWINGS

FIG. 5 is a diagram illustrating an example of the process described with respect to FIG. 4;

DETAILED DESCRIPTION OF PREFERRED EMBODIMENTS

The following detailed description refers to the accompanying drawings. The same reference numbers in different drawings may identify the same or similar elements.

Systems and/or methods described herein may enable a group of users to share location data via a short message service ("SMS") text messaging session ("text messaging session"). A graphical representation of the shared location data may be displayed to each of the users. For each user, the graphical representation of the shared location data may depict a current location of the user along with an intuitive comet trails representing a sense of a direction and a speed of the user.

While the following description focuses on SMS messages ("text messages"), it will be appreciated that systems and/or methods, described herein, are equally applicable to other types of messages, such as multimedia message services ("MMS") messages, text message service ("TMS") messages, instant messages ("IMs"), email messages, or other types of text-based messages.

Figure 1:
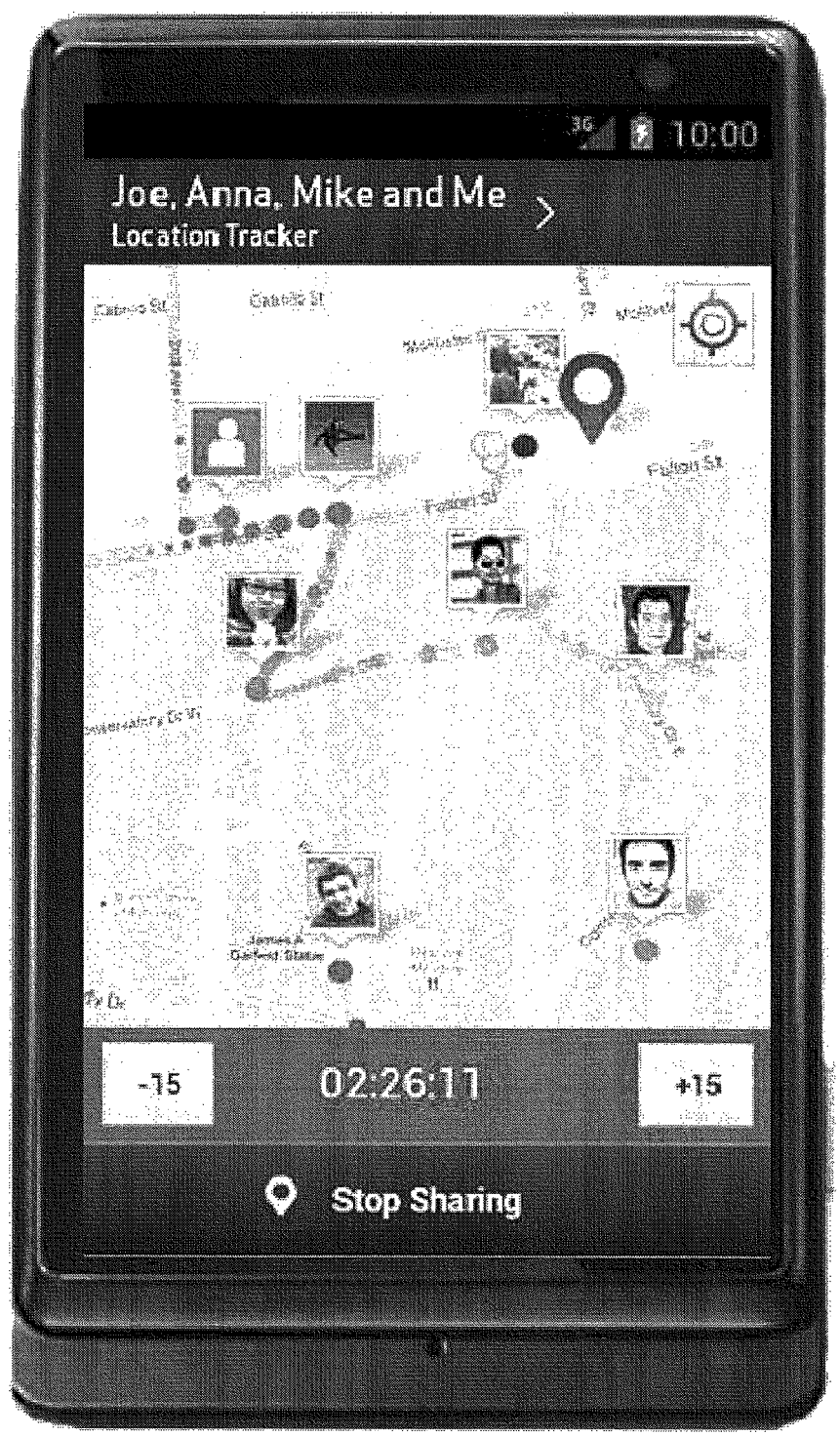
FIG. 1 is a diagram illustrating an overview of a location tracking system according to implementations described herein.

FIG. 1 provides a diagram illustrating an overview 100 of a location tracking system according to implementations described herein. Referring to FIG. 1, a group of users communicating, via a text messaging application running on their mobile devices, may decide to meet up at the mall. Each user may execute a location sharing application for sharing their location information with the other users. To share location information, each location sharing application may determine a location of one of the users and may send a text message with information identifying the location, to each mobile device of the other users. Each location sharing application may receive, from each of the other mobile devices, text messages that include information identifying locations of the other users. The location sharing applications may determine relevant map data based on the locations of the users and may cause the mobile device to display the map data along with a group of markers representing the locations of the group of users.

Each location sharing application may periodically send additional text messages including updated location information to the other mobile devices and may periodically receive updated location information included in text messages sent from the other mobile devices. Based on the updated location information, the location sharing application may cause a graphical representation of the location information for each mobile device to be displayed as a comet trail. As shown in FIG. 1, each comet trail may include a series of markers beginning with a first marker representing a current location of the corresponding user, followed by subsequent markers representing previous locations of the corresponding user. The comet trails may allow the users to quickly and easily determine where each of the other users are and when they might arrive at the mall.

Figure 2:
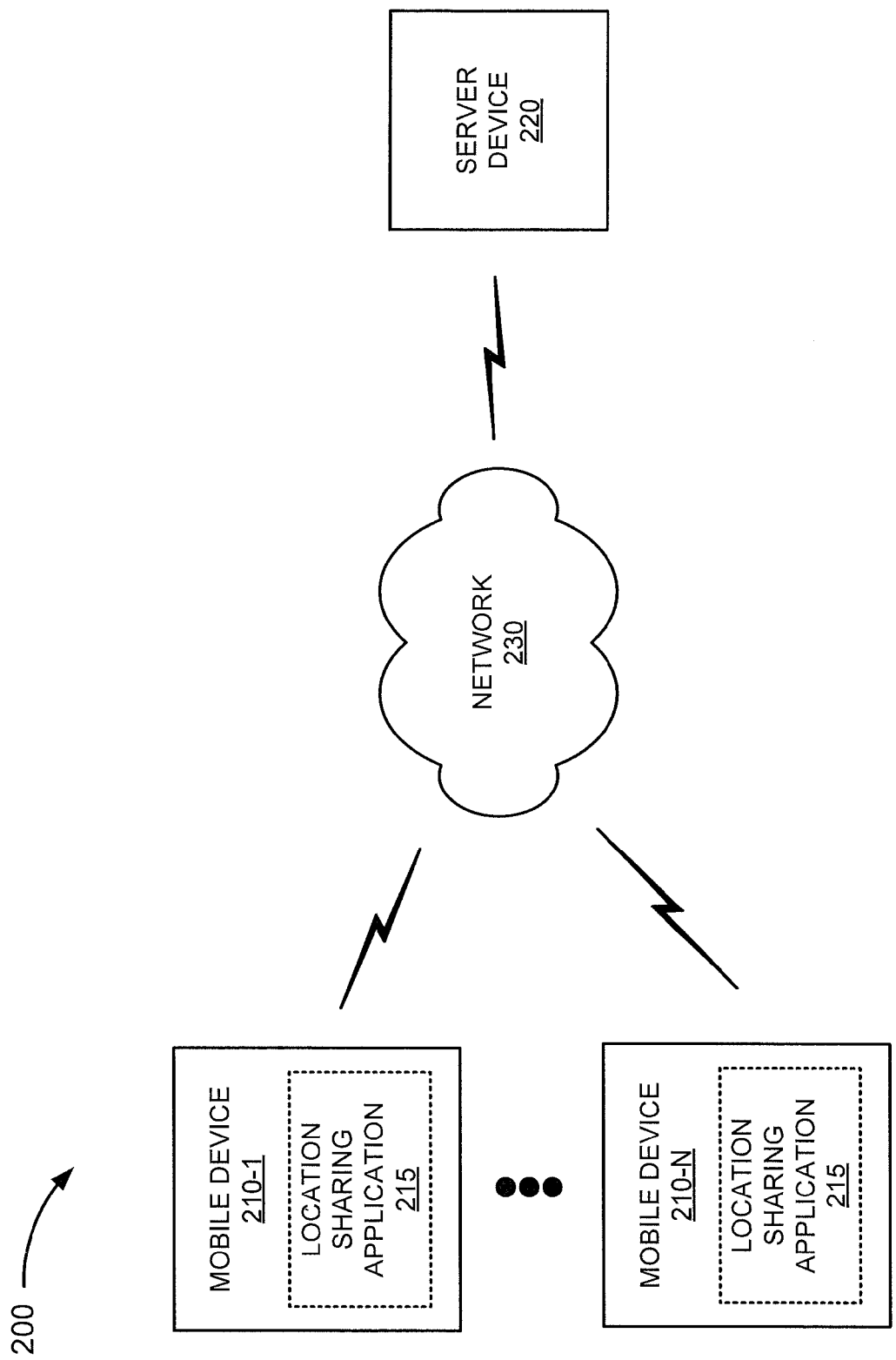
FIG. 2 is a diagram of an environment in which systems and/or methods, described herein, may be implemented.

FIG. 2 is a diagram of an environment 200 in which systems and/or methods described herein may be implemented. As shown in FIG. 2, environment 200 may include a group of mobile devices 210-1 through 210-N (where N>1) (referred to herein collectively as mobile devices 210 and individually as mobile device 210) and a server device 220 interconnected by a network 230. Devices of environment 200 may interconnect via wired connections, wireless connections, or a combination of wired and wireless connections.

Mobile device 210 may include a device capable of sharing location information, via text messages, generating a graphical representation of the shared location information, and providing the graphical representation of the shared location information for display. For example, mobile device 210 may include a personal digital assistant (PDA) (e.g., that include a radio telephone, a pager, Internet/intranet access, etc.), a tablet computer, a smart phone, a laptop, a gaming device, and/or another type of device capable of sending text messages. In some implementations, mobile device 210 may include location sharing application 215. For example, mobile device 210 may obtain location sharing application 215 or may be preloaded with location sharing application 215. Mobile device 210 may be configured, using location sharing application 215, to share location information with one or more other mobile devices 210.

Server device 220 may include one or more server devices that receive, process, and provide information in a manner described herein. Server device 220 may enable a group of mobile devices 210 to communicate and/or share location information via one or more text messages.

Network 230 may include a local area network (LAN), a wide area network (WAN), a metropolitan area network (MAN), a mesh network, an intranet, the Internet, a cellular network, an optical fiber (or fiber optic)-based network, a satellite network, or a combination of networks. In some implementations, network 230 may employ one or more wireless communication protocols for a wireless personal area network (WPAN) and/or a wireless local area network (WLAN), such as, for example, IEEE 802.15 (e.g., Bluetooth) and IEEE 802.11 (e.g., Wi-Fi).

Although FIG. 2 shows example components of environment 200, in some implementations, environment 200 may include fewer components, different components, differently arranged components, or additional components than those depicted in FIG. 2. In some implementations, one or more components of environment 200 may perform one or more tasks described as being performed by one or more other components of environment 200.

Figure 3:
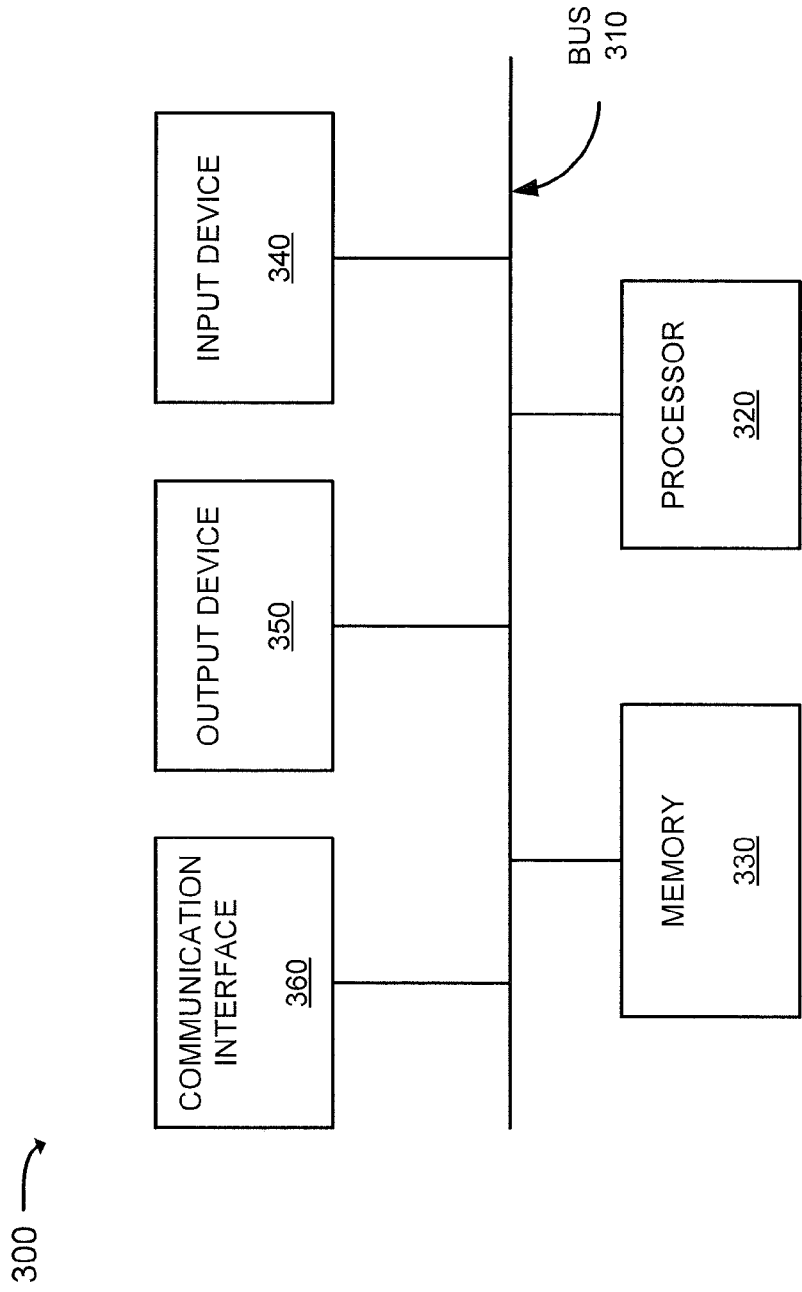
FIG. 3 illustrates example components of a device that may be used within the environment of FIG. 2 according to one or more implementations described herein.

FIG. 3 illustrates example components of a device 300 that may be used within environment 200. Device 300 may correspond to mobile device 210 and/or server device 220. In some implementations, mobile device 210 and/or server device 220 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. In some implementations, one or more components of device 300 may perform one or more tasks described as being performed by one or more other components of device 300.

Figure 4:
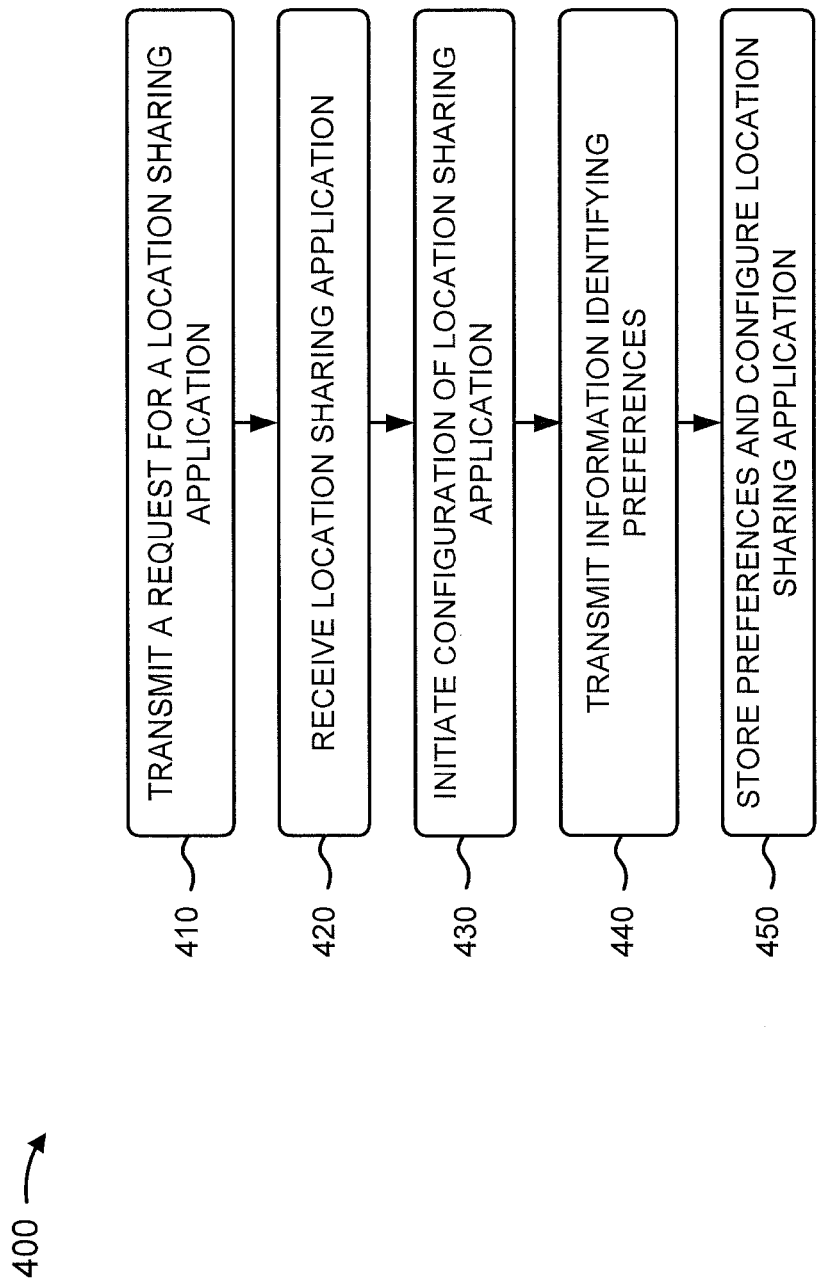
FIG. 4 is a flow chart of an exemplary process for initiating a location sharing session.

FIG. 4 is a flowchart of an example process 400 for configuring a mobile device for sharing location information. In some implementations, process 400 may be performed by mobile device 210. In some implementations, one or more blocks of process 400 may be performed by one or more devices instead of, or possibly in conjunction with, mobile device 210.

Process 400 may include transmitting a request for location sharing application 215 (block 410). For example, mobile device 210 may transmit a request for location sharing application 215 that may enable mobile device 210 and one or more other mobile devices 210 to share location information. In some implementations, a user may cause mobile device 210 to obtain information regarding applications that may be purchased by the user. For example, the user may cause mobile device 210 to access an application store, which provides information regarding applications (including location sharing application 215) that may be purchased. In some implementations, the user may cause mobile device 210 to access the application store via, for example, a user interface (such as a browser) or in another manner. The user may then select, using mobile device 210, information regarding location sharing application 215 from the information regarding the applications to cause mobile device 210 to transmit a request for location sharing application 215.

Process 400 may include receiving location sharing application 215 (block 420). For example, mobile device 210 may receive location sharing application 215 and store location sharing application 215 in a memory associated with mobile device 210 (e.g., memory 330). In some implementations, a user, of mobile device 210, may establish an account associated with location sharing application 215 prior to, or after, receiving location sharing application 215.

In some implementations, location sharing application 215 may be included within a text messaging application that allows the user (e.g., mobile device 210) to communicate text messages with one or more other users (e.g., one or more other mobile devices 210). In some implementations, mobile device 210 may include a text messaging application and location sharing application 215 may execute in conjunction with the text messaging application. For example, location sharing application 215 may comprise an add-on and/or extension for the text messaging application.

Process 400 may include initiating a configuration of location sharing application 215 (block 430). For example, a user may initiate location sharing application 215 and identify, using mobile device 210, one or more preferences relating to sharing location information. In some implementations, the user may identify the one or more preferences using one or more elements of a user interface provided by mobile device 210. The one or more elements may include, for example, one or more text input elements, one or more drop down menu elements, one or more checkbox elements, one or more radio button elements, and/or any other types of elements that may be used to receive information from the user.

In some implementations, the one or more preferences may include a preference of the user with respect to displaying location information associated with the user. For example, the user may identify a particular image (e.g., provide information identifying an image stored in a memory of mobile device 210, use a camera associated with mobile device 210 to capture an image, etc.) that is to be displayed in conjunction with location information for the user.

In some implementations, the one or more preferences may include a preference of the user with respect to an interval for determining and/or providing updated location information. Examples of information indicating an interval for determining and/or providing updated location information may include every N seconds (where N is any number greater than 0), when requested, after moving a particular distance away from a previously shared location, and/or other information indicating an interval for determining and/or providing updated location information.

In some implementations, the user may provide information indicating that location sharing application 215 should provide and/or determine updated location information at different intervals depending on a speed at which the user is current traveling. For example, the user may providing information indicating that location sharing application 215 should determine and/or provide updated location information every 5 seconds when a speed of the user is greater than 5 miles per hour (mph) and that location sharing application 215 should provide updated location information only when a change in a location of the user is greater than 250 feet when a speed of the user is not greater than 5 mph.

In some implementations, the one or more preferences may include a preference of the user with respect to one or more contacts associated with the user. For example, the user may identify one or more contacts with whom location sharing application 215 should always share location information, one or more contacts with whom location sharing application 215 should never share location information, and/or one or more contacts with whom location sharing application 215 should obtain verification from the user (e.g., provide a prompt) prior to sharing location information.

In some implementations, the one or more preferences may include a preference of the user with respect to displaying shared location information. For example, the user may provide information indicating a particular source for obtaining relevant map data, a level of zoom, graphical qualities for displaying information associated with the user and/or one or more other users (e.g., a particular color to be used for the comet trail), a maximum number of users to be displayed, and/or an order of preference for selecting a display for displaying location information (e.g., information indicating that shared location information should be displayed via an external display when mobile device 210 is connected to an external display, information indicating that shared location information should be displayed via an internal display when mobile device 210 is not connected to an external display, etc.).

In some implementations, a type of the account, of the user, associated with location sharing application 215 may determine preferences that the user is able to identify. For example, location sharing application 215 may enable the user to identify only a particular group of the above preferences and/or identify additional preferences based on the type of the account with which the user is associated.

In some implementations, location sharing application 215 may analyze information relating to mobile device 210 and/or a user, of mobile device 210, to determine the one or more preferences of the user relating to sharing location information. For example, the information relating to mobile device 210 may include information identifying contacts of the user and/or information identifying communications between the user and the contacts (e.g., e-mail messages, text messages, etc.), documents of the user, information relating to preferences of the user, and/or other types of information indicating preferences of the user. As an example, location sharing application 215 may analyze the information relating to mobile device 210 and may determine that the user has indicated that mobile device 210 should block calls received from a particular user. Location sharing application 215 may determine to never share location information with the particular user and/or to provide a prompt requesting the user to confirm that location information is to be shared with the particular user prior to location sharing application sharing location information with the particular user.

Process 400 may include transmitting information identifying the one or more preferences (block 440). In some implementations, the user may cause mobile device 210 to transmit, to server device 220, information identifying the one or more preferences relating to the user. Server device 220 may receive the information identifying the one or more preferences and store the information identifying the one or more preferences in a user profile associated with the user. For example, the information identifying the one or more preferences may include an identifier and/or other information identifying the user and/or mobile device 210. Server device 220 may identify a user profile associated with the user and/or mobile device 210 based on the identifier and/or other information identifying the user and/or mobile device 210. Server device 220 may store the information identifying the one or more preferences in the user profile.

In some implementations, the user profile and/or the information identifying the one or more preferences may include information identifying one or more other mobile devices 210 associated with the user. Server device 220 may send information identifying the one or more preferences to the one or more other mobile devices 210 associated with the user. For example, the user may download and install the location sharing information on multiple mobile devices 210. The user may enter the configuration on one of the multiple mobile devices 210 and may transmit the information identifying one or more preferences to server device 220. Server device 220 may send information identifying the one or more preferences to one or more other ones of the multiple mobile devices 210 to configure location sharing application 215 on the one or more other ones of the multiple mobile devices 210.

Process 400 may include storing the preferences and configuring location sharing application 215 (block 450). For example, a user, of mobile device 210, may cause mobile device 210 to store all or a portion of the preferences. Location sharing application 215 may be configured based on storing all or a portion of the preferences. In some implementations, the user may configure location sharing application 215 by adjusting parameters associated with one or more components of mobile device 210. For example, the user may adjust a contrast setting of a display of mobile device 210, adjust an aspect ratio for the display of mobile device 210, etc.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

FIG. 5 is an example user interface 500 that may be used in connection with process 400 described in connection with FIG. 4. For example, user interface 500 may be provided by mobile device 210 to a user, of mobile device 210, to enable the user to identify information (e.g., preferences) that may be used to configure location sharing application 215 and enable mobile device 210 to share location information with another mobile device 210.

As shown in relation to FIG. 5, user interface 500 may allow the user to identify a username and an image that are to be displayed in conjunction with the user's location information. For example, the user may provide a nickname and a recent image of the user that the user desires to be displayed in conjunction with the user's location information.

User interface 500 may allow the user to identify how often location sharing application 215 should determine and provide updated location information. User interface 500 may initially display a default interval for determining and providing updated location information. As shown in FIG. 5, user interface 500 provides information indicating that location sharing application 215 is to determine and provide updated location information every 5 seconds.

Once a user has identified the preferences, user interface 500 may allow the user to select a "SUBMIT" option to store the preferences and/or submit the preferences to server device 220.

As shown in relation to FIG. 5, user interface 500 may also allow the user to select a "BACK" option to cause mobile device 210 to provide information regarding location sharing application 215. As shown in relation to FIG. 5, user interface 500 may also allow the user to select a "MORE CONFIGURATION" option to enable the user to identify additional information that may be used to configure location sharing application 215. For example, if the user desires to always share location information with multiple other users, the user may select a contact corresponding to one of the users and then select the MORE CONFIGURATION option to select contacts corresponding to the remaining ones of the multiple users.

The number of elements of user interface 500 shown in FIG. 5 is provided for explanatory purposes. In practice, user interface 500 may include additional elements, fewer elements, different elements, or differently arranged elements than those shown in FIG. 5. As indicated above, FIG. 5 is provided merely as an example. Other examples are possible and may differ from what was described with regard to FIG. 5.

Figure 6:
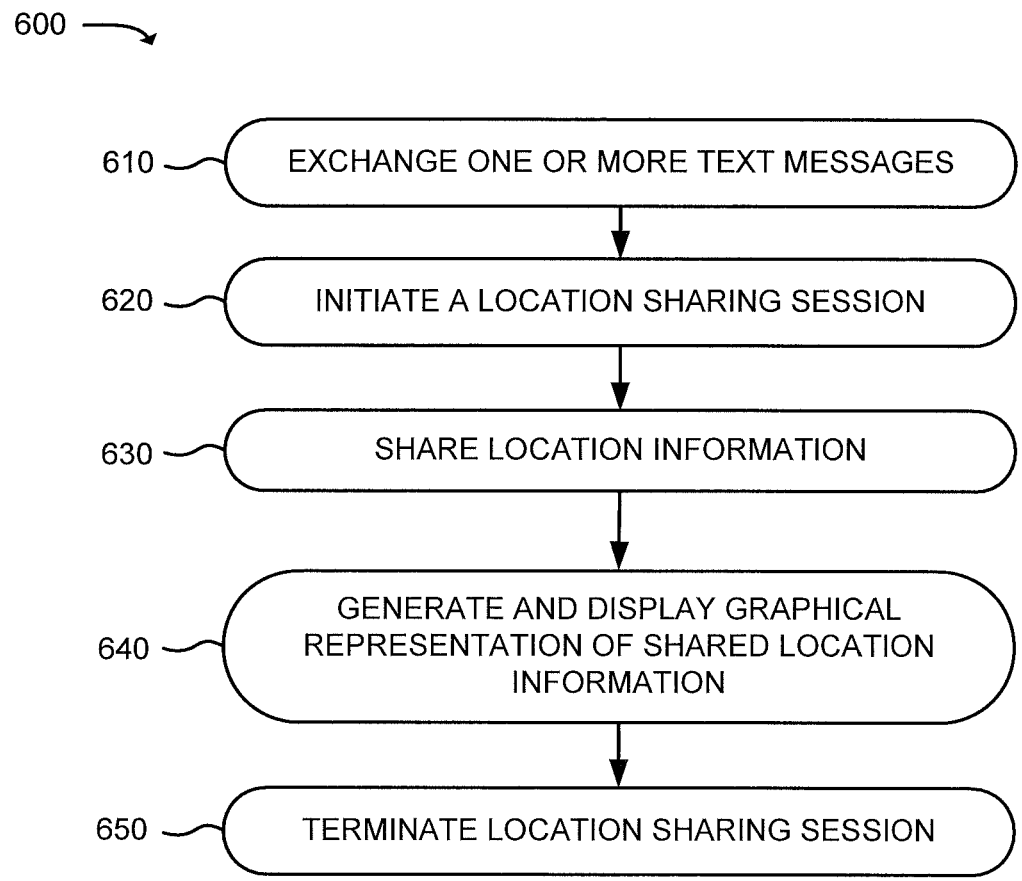
FIG. 6 is a flow chart of an exemplary process for tracking locations of mobile devices participating in a location sharing session using a comet trail.

FIG. 6 is a flow chart of an example process 600 for sharing location information. In some implementations, process 600 may be performed by mobile device 210. In other implementations, one or more blocks of process 600 may be performed by one or more devices instead of, or possibly in conjunction with, mobile device 210.

As shown in FIG. 6, process 600 may include exchanging one or more text messages (block 610). For example, a user of mobile device 210 may decide to send a text message to one or more other users (referred to herein collectively as "a group of recipients" and individually as "recipient"). The user may activate a text messaging application on mobile device 210 and select an option to create a new text message. Based on the selection, the text messaging application may provide a messaging user interface that allows the user to create the new text message.

In some implementations, the messaging user interface may include an address line for providing information identifying the group of recipients, a text block for providing text to be included in the message, and/or a message window for displaying messages sent and/or received during the messaging session. The user may provide the text of the message in the text block and may specify, via the address line, the group of recipients (e.g., provide a telephone number for a mobile device associated with each recipient (referred to herein collectively as "group of recipient devices 210" and individually as "recipient device 210"), select one or more contacts from a list of contacts, select one or more telephone numbers from an address book, etc.). The user may instruct mobile device 210 to send the text message by selecting an appropriate option on mobile device 210 (e.g., selecting a send button).

In some implementations, mobile device 210 may generate a text message that includes the text provided via the text block. Mobile device 210 may cause the text provided in the text block to be displayed in the message window and may output the text message to the group of recipient devices 210.

Process 600 may include initiating a location sharing session (block 620). For example, mobile device 210 may initiate a location sharing session with recipient devices 210. In some implementations, mobile device 210 execute location sharing application 215 to initiate a location sharing session. For example, mobile device 210 may store location sharing application 215 in a memory (e.g., memory 330) of mobile device 210. Mobile device 210 may execute location sharing application 215 to initiate the location sharing session.

In some implementations, mobile device 210 may automatically execute location sharing application 215 upon exchanging one or more text messages. For example, mobile device 210 may determine that the text message is addressed to a particular recipient. Mobile device 210 may access preference information associated with the user. The preference information may indicate that the user desires to always share location information with the particular recipient. Mobile device 210 may execute location sharing application 215 based on sending the text message to the particular recipient.

In some implementations, mobile device 210 may execute location sharing application 215 based on input received from the user. For example, the user and the group of recipients may exchange text messages via the text messaging application. At some point during the exchange of text messages, the user may desire to share location information with the group of recipients. As such, the user may select information associated with location sharing application 215 (e.g., an icon of location sharing application 215, an icon labeled "Share," etc.) on a user interface provided by mobile device 210.

In some implementations, mobile device 210 may provide the user interface via the text messaging application. For example, the text messaging application may display, via the messaging user interface, an icon for initiating location sharing application 215. The user may select the icon and mobile device 210 may execute location sharing application 215 in response to the selection.

In some implementations, mobile device 210 may initiate the location sharing session based on sending initial location information for the user to the group of recipients. For example, mobile device 210 (e.g., location sharing application 215) may obtain information indicating an initial location of mobile device 210 from a global positioning system (GPS) associated with mobile device 210. Mobile device 210 may generate initial location information that includes information indicating the initial location of mobile device 210. Mobile device 210 may send the initial location information, via a text message, to the group of recipient devices 210 to initiate the location sharing session. In some implementations, the text message may include a command that causes each recipient device 210 to launch location sharing application 215.

In some implementations, the text message may include text provided by the user. For example, during the text messaging session, the user may send provide text via the text block of the user interface. Mobile device 210 may generate a text message that includes the provided text and may attach the initial location information to the text message to initiate the location sharing session. Mobile device 210 may cause the provided text to be displayed via the message window. The initial location information may not be displayed via the message window.

In some implementations, mobile device 210 may initiate the location sharing session based on receiving a location message from one or more recipient devices 210. For example, mobile device 210 may receive a location message from a recipient device 210. In some implementations, mobile device 210 may determine that the location message is associated with the user and the group of recipients based on information included in an address line of the text message.

Mobile device 210 may initiate the location sharing session based on the location message being associated with the user and the group of recipients.

In some implementations, mobile device 210 may determine that the location message is associated with a particular recipient and may initiate the location sharing session based on receiving the location message from the particular recipient device 210. For example, mobile device 210 may access preference information associated with the user. The preference information may indicate that mobile device 210 is to initiate a location sharing session when a location message is received from the particular recipient. Mobile device 210 may initiate the location sharing session based on receiving the location information from the particular recipient device 210.

In some implementations, mobile device 210 may provide a notification indicating that mobile device 210 has received location information from the group of recipient devices 210 and/or that mobile device 210 has initiated the location sharing session. For example, mobile device 210 may cause a notification to be displayed in the message window of the messaging user interface. The notification may indicate that one or more recipients have sent location information and/or that a location sharing session has been initiated.

In some implementations, the notification may request that the user indicate whether the user would like to share location information with the group of recipients. For example, the notification may include a button that the user can select to share location information with the group of recipients. Mobile device 210 may initiate the location sharing session in response to the user selecting the button.

Process 600 may include sharing location information (block 630). For example, mobile device 210 may share location information with the group of recipient devices 210 via one or more text messages. In some implementations, mobile device 210 may receive location information from the group of recipient devices 210 based on sending the initial location information and/or sending updated location information to the group of recipient devices 210. For example, the user (e.g., mobile device 210) may move from the initial location to another location. Mobile device 210 may determine updated location information for mobile device 210. The updated location information may include information indicating that the user has moved to the other location (e.g., information identifying the other location, information identifying a distance and direction that the user has traveled from the initial location, etc.). Mobile device 210 may send the updated location information to the group of recipient devices 210. In addition, each recipient device 210 may determine and send updated location information regarding a corresponding recipient device 210 to mobile device 210 and the other recipient devices 210.

In some implementations, mobile device 210 may send location information to the group of recipient devices 210 based on receiving location information from one or more recipient devices 210. For example, each time mobile device 210 receives location information from a recipient device 210, mobile device 210 may determine location information for the user and/or may send the location information to the group of recipient devices 210.

In some implementations, mobile device 210 may periodically share location information with the group of recipient devices 210. For example, mobile device 210 may be configured to share location information at a first time interval. In some implementations, mobile device 210 may determine the first interval based on preference information associated with the user. For example, the preference information may indicate that location information should be shared once every second, once every 5-8 seconds, when the user moves a particular distance, etc. Mobile device 210 may determine and/or send location information to the group of recipient devices 210 based on the first interval.

Additionally, or alternatively, mobile device 210 may periodically receive location information from the group of recipient devices 210. For example, mobile device 210 may each recipient device 210 may send location information to mobile device 210 based on a second interval. In some implementations, the second interval may be the same as the first interval at which mobile device 210 determines and/or sends location information to the group of recipient devices 210. For example, mobile device 210 may initiate the location sharing session by sending a location message to the group of recipient devices 210. The location message may include information identifying an interval for sharing location information. Mobile device 210 and the group of recipient devices 210 may each determine and/or send location information based on the interval. Additionally, or alternatively, mobile device 210 may periodically receive location information from one or more recipient devices 210 based on an interval that is different from an interval at which mobile device 210 determines and/or sends location information to the group of recipient devices.

Process 600 may include generating and displaying a graphical representation of the shared location information (block 640). For example, mobile device 210 (e.g., location sharing application 215) may generate a graphical representation based on the location information determined for the user and the location information received from the group of recipient devices 210 and may display the graphical representation via a display associated with mobile device 210. Mobile device 210 may cause the graphical representation to be displayed via an internal display (e.g., output device 350) and/or an external display (e.g., a display connected to mobile device 210 via one or more wired and/or wireless connections).

In some implementations, the graphical representation may include a map associated with the shared location information. For example, based on the shared location information, mobile device 210 may determine that mobile device 210 and the group of recipient devices 210 are located within a particular geographic area (e.g., a particular neighborhood, a particular city, a particular state, etc.). Mobile device 210 may obtain map data associated with the geographic area and may generate a graphical representation that depicts the geographic area.

In some implementations, the graphical representation may include a set of comet trails. For example, mobile device 210 may determine a group of locations for mobile device 210 based on the location information determined for the user (e.g., mobile device 210). The group of locations may include each location determined for mobile device 210 during the location sharing session. For example, mobile device 210 may determine a first location based on the initial location information determined for the user (e.g., a location of the user when the location sharing session is initiated). Mobile device 210 may generate a graphical representation that includes a map of a geographic area including the first location and a first comet trail. The first comet trail may include a head portion that includes a marker corresponding to a current location of the user (e.g., the first location).

Subsequently, mobile device 210 may determine updated location information for the user (e.g., after expiration of a particular interval). Mobile device 210 may determine that the user is now located at a second location based on the updated location information. Mobile device 210 may update the first comet trail to include a marker corresponding to the second location. For example, mobile device 210 may modify the first comet trail to include a head portion that includes a marker corresponding to the second location of the user. The head portion may be connected to a body portion including one or more markers corresponding to previous locations of the first user (e.g., the marker corresponding to the first location). Mobile device 210 may continue to determine updated locations and to modify the first comet trail in a similar manner each time mobile device 210 determines location information for the user.

In some implementations, the first comet trail may represent a direction of movement associated with the user. For example, a marker in the head portion of the first comet trail (e.g., a marker corresponding to the second location) may be darker (e.g., a solid dot) relative to markers corresponding to previous locations of the user (e.g., the marker corresponding to the first location). As the user continues to move during the location sharing session, mobile device 210 may continue to modify the comet trail in a similar manner, such that markers corresponding to previous locations of the user may be made progressively lighter (e.g., less solid) and may eventually fade away to represent a direction of movement of the user.

Additionally, or alternatively, a spacing of the markers within the first comet trail may represent a speed associated with the user. For example, a comet trail representing a user that is moving quickly (e.g., driving in a car) may be longer and may have markers that may be spaced further apart within the comet trail relative to a comet trail representing a user that is moving more slowly. Likewise, a comet trail representing a user that is moving slowly (e.g., walking) may be shorter and may have markers that may be spaced more closely together relative to a comet trail representing a user that is moving more quickly.

In some implementations, mobile device 210 may send, via one or more text messages, information associated with the first comet trail and/or information associated with the modified first comet trail to the group of recipient devices 210. For example, mobile device 210 may send location information that includes comet trail information for displaying the first comet trail and/or the modified first comet trail to the group of recipient devices 210. Each recipient device 210 may receive the location information and may display the first comet trail and/or the modified first comet trail on a display associated with the recipient device 210 based on the comet trail information.

In some implementations, mobile device 210 may generate each second comet trail, for each recipient device 210, in a manner similar to that described in connection with the first comet trail. For example, mobile device 210 may receive location information from a particular recipient device 210 and may generate and display a second comet trail for the particular recipient associated with the particular recipient device 210 on the map.

In some implementations, one or more second comet trails may be generated based on information received from one or more recipient devices 210. For example, mobile device 210 may receive, via one or more text messages, location information from one or more recipient devices 210 that includes comet trail information for displaying one or more second comet trails. Mobile device 210 may generate the one or more second comet trails based on the received comet trail information.

In some implementations, the first comet trail and each second comet trail may be visually distinguishable on the map. For example, the comet trails may be different colors, different sizes, different shapes, associated with different images, associated with different animations, etc. In some implementations, the first comet trail may be visually distinguishable from the group of second comet trails. For example, the first comet trail may be a first color (e.g., blue) and the group of second comet trails may be a different color (e.g., red, green, orange, purple, etc.).

In some implementations, the first comet trail and/or one or more of the group of second comet trails may be visually distinguishable based on preference information associated with the user. For example, the preference information may identify one or more visual properties to be associated with the first comet trail and/or one or more second comet trails. Examples of the one or more visual properties may include a particular image to be associated with a comet trail, a color of a comet trail, a size of a marker included in a comet trail, a shape of a marker included in a comet trail, an animation for connecting markers in a comet trail, and/or similar type of visual properties that may be specified by a user.

In some implementations, the graphical representation may include a messaging banner that allows the user to switch between a display of the graphical representation of the shared location information and the messaging user interface. For example, the messaging banner may be a selectable icon that includes information identifying the user and one or more recipients. In some implementations, the messaging banner may be displayed in conjunction with the first comet trail and/or the group of second comet trails to enable the user to switch from a display of the graphical representation of the shared location data to the messaging user interface. Additionally, or alternatively, the messaging banner may be displayed in conjunction with the messaging user interface to enable the user to switch from the messaging user interface to a display of the graphical representation of the shared location data. In some implementations, the messaging banner may include the messaging user interface. Thus, in those implementations, the user may exchange text messages with the group of recipients while the location information is displayed by mobile device 210.

In some implementations, the graphical representation may include information indicating a length of time associated with the location sharing session. For example, the graphical representation may include a timer showing an amount of time that the user has been sharing location information with the group of recipients. Additionally, or alternatively, the graphical representation may include information indicating an amount of time remaining in the location sharing session. For example, mobile device 210 may initiate the location sharing session for a particular amount of time, such as, for example, 15 minutes. The graphical representation may include a timer that is initially set to 15 minutes and incrementally counts down to zero during the location sharing session. Upon reaching zero, mobile device 210 may terminate the location sharing session as described in conjunction with block 650.

In some implementations, the graphical representation may include one or more selectable icons to enable the user to adjust the particular amount of time. For example, the graphical representation may include a banner that shows an amount of time remaining in the location sharing session and includes a first button for increasing the amount of time remaining in the location sharing session (e.g., a button that the user can select to increase (e.g., add 1 minute, 5, minutes, 15 minutes, etc.) the particular amount of time) and a second button for decreasing the amount of time remaining in the location sharing session (e.g., a button that the user can select to decrease the particular amount of time and/or terminate the location sharing session prior to the particular amount of time lapsing).

Process 600 may include may include terminating the location sharing session (block 650). For example, mobile device 210 may terminate the location sharing session (e.g., stop sending location information to the group of recipient devices 210) and may store information associated with the location sharing session in a memory (e.g., memory 330). In some implementations, mobile device 210 may store shared location information and/or the information regarding the generated comet trails in association with information identifying one or more messages exchanged before, during, and/or after initiating the location sharing session, information identifying one or more recipients, and/or information identifying one or more of the group of recipient devices 210.

In some implementations, mobile device 210 may send a message to the group of recipient devices 210 indicating that mobile device 210 is terminating the location sharing session and/or is no longer sending location information with the group of recipient devices 210. In response to the message, the group of recipient devices 210 may stop sending location information to mobile device 210.

In some implementations, mobile device 210 may terminate the location sharing session based on input received from the user. For example, the user may provide information indicating that mobile device 210 is to terminate the location information session. Mobile device 210 may terminate the location sharing session based on the provide information. In some implementations, the graphical representation and/or the messaging user interface may include an icon for stopping the sharing of location information with the group of recipients. The user may indicate that mobile device 210 is to terminate the location sharing session by selecting the icon. Mobile device 210 may determine that the user has selected the icon and may terminate the location sharing session based on the user selecting the icon.

In some implementations, the user may provide information indicating that another user is to be added to the location sharing session. Mobile device 210 may terminate the location sharing session to add the other user to the location sharing session. For example, during the location sharing session, the user may select an icon for adding a new user and/or may initiate a new location sharing session between the user, the group of recipients, and the other user. Mobile device 210 may terminate the current location sharing session and store information associated with the location sharing session, based on the user initiating the new location sharing session. Mobile device 210 may initiate the new location sharing session for sharing location information between the user, the group of recipients, and the other user.

In some implementations, mobile device 210 may generate a graphical representation for the new location sharing session based on the stored information associated with the previous location sharing session. For example, mobile device 210 may generate a graphical representation that includes comet trails (e.g., the first comet trail and/or one or more of the group of second comet trails) generated for the previous location sharing session in addition to a comet trail generated based on sharing location information with the other user.

In some implementations, mobile device 210 may terminate the location sharing session after a particular amount of time. For example, mobile device 210 may determine that preference information associated with the user indicates a maximum amount of time for sharing location information. Mobile device 210 may determine that mobile device 210 has been sharing location information with the group of recipient devices 210 for the maximum amount of time and may terminate the location sharing session.

In some implementations, mobile device 210 may terminate the location sharing session based on determining that one or more recipient devices 210 has stopped sharing location information with mobile device 210. For example, mobile device 210 may receive a message from one of the recipient devices 210. The message may indicate that the recipient device 210 has stopped sharing location information. Mobile device 210 may terminate the location sharing session based on receiving the message.

In some implementations, mobile device 210 may terminate the location sharing session when mobile device 210 is within a particular geographic distance from the group of recipient devices 210. For example, may determine a preference of the user indicating that mobile device 210 is to terminate a location sharing session when mobile device 210 is within a particular geographic distance from of each recipient device 210 with which mobile device 210 is sharing location information. Mobile device 210 may determine, based on the shared location information, that mobile device 210 is within the particular geographic distance from each of the group of recipient devices 210 and may terminate the location sharing session.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
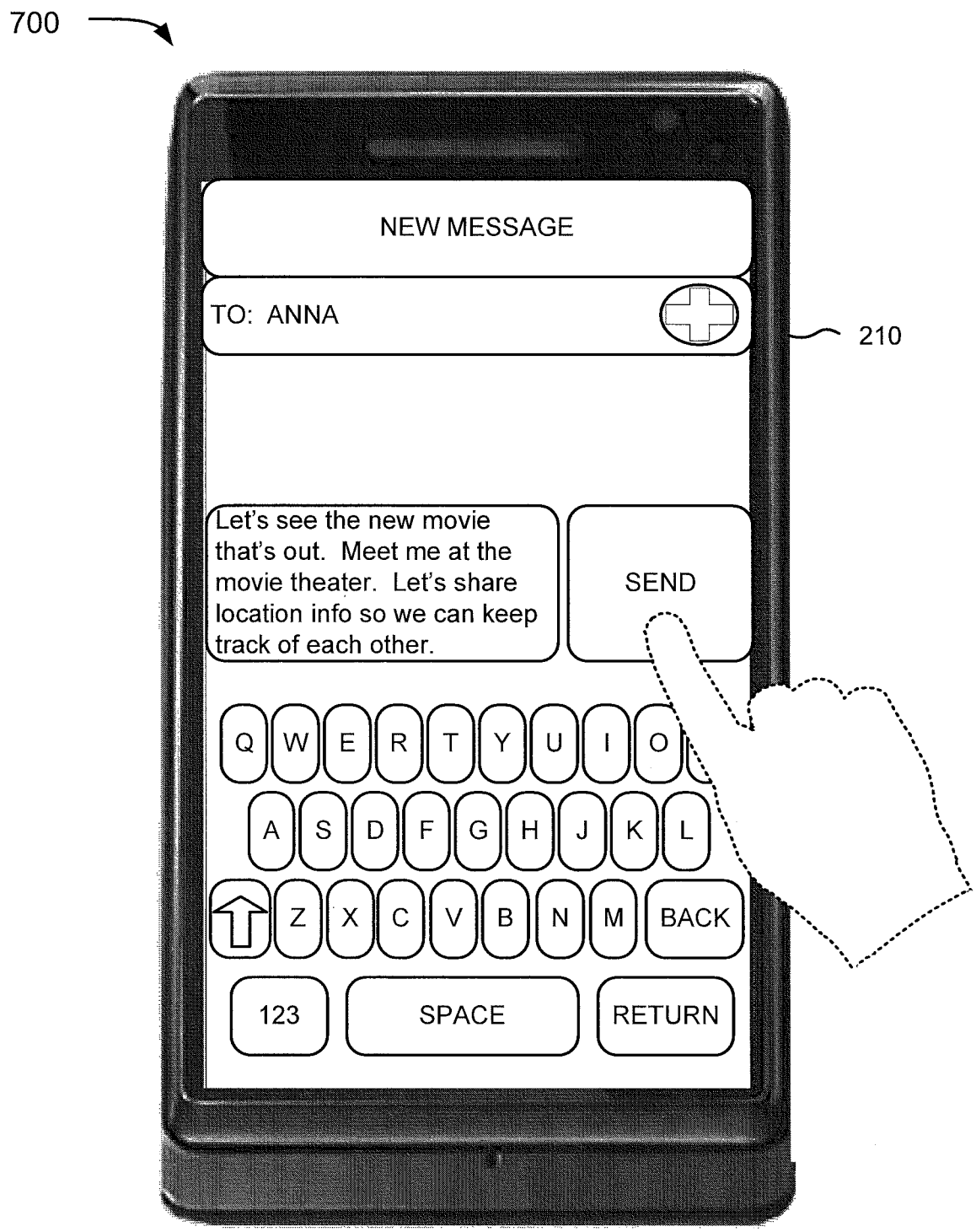
FIGS. 7A-7F are diagrams illustrating an example of the process described with respect to FIG. 6.

FIGS. 7A-7F illustrate an example 700 of the process described in connection with FIG. 6. For example 700, assume that a user, Bob, uses a text messaging application running on Bob's mobile device 210 to create a text message to ask another user, Anna, if she would like to meet him at the movie theater to see a new movie. Assume that mobile device 210 includes location sharing application 215 and that Bob has configured location sharing application to share location information for 15 minutes. As shown in FIG. 7A, Bob selects the "SEND" button to cause mobile device 210 to send the text message to Anna's mobile device.

Figure 7B:
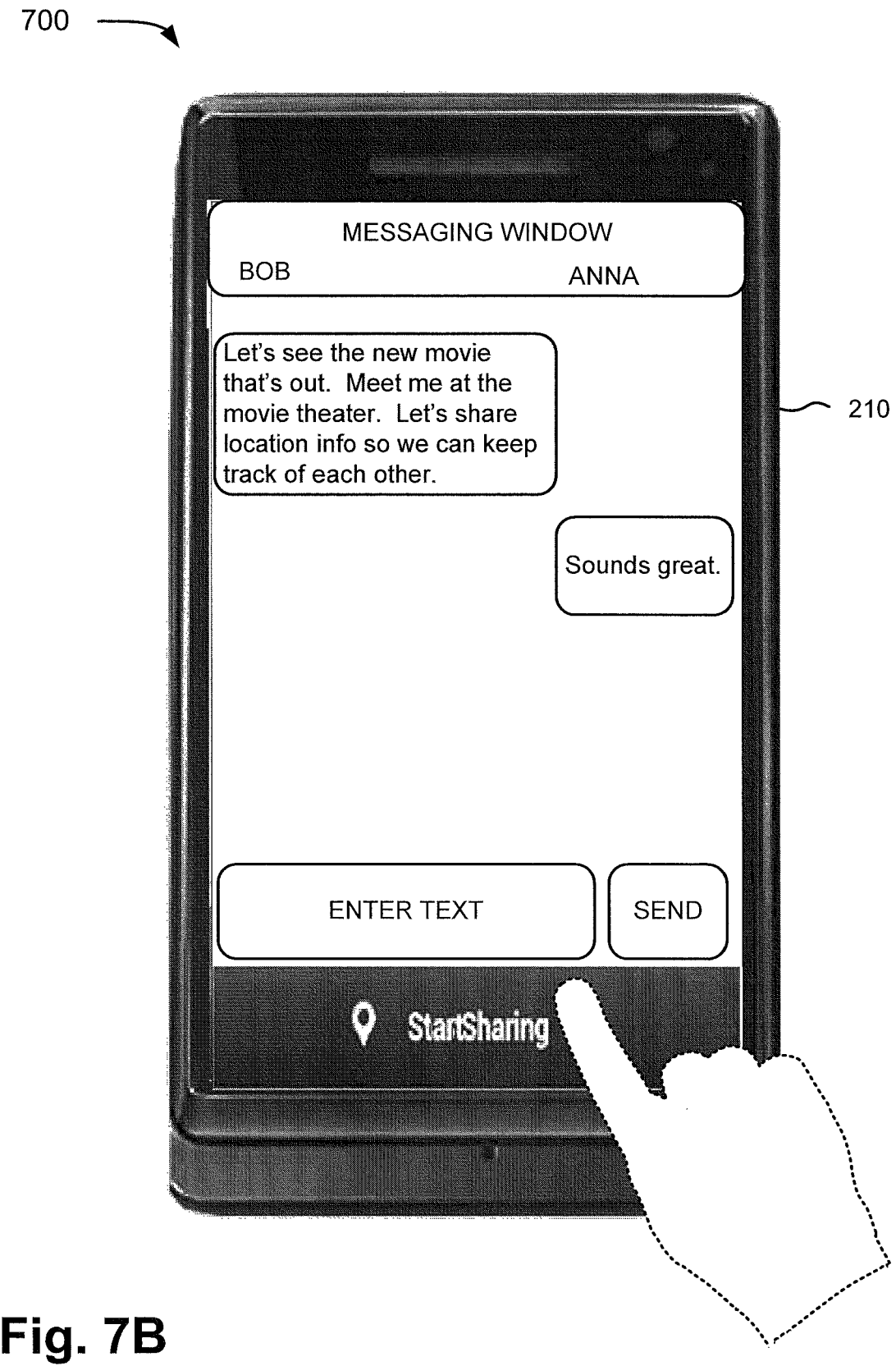

Referring now to FIG. 7B, assume that mobile device 210 generates and sends the text message to Anna's mobile device and causes the text provided by Bob via the text block to be displayed in a messaging window. Further, assume that mobile device 210 receives a text message from Anna's mobile device and that mobile device 210 causes the text message to be displayed in the messaging window. As shown in FIG. 7B, Bob may read Anna's message in the messaging window and selects an icon for initiating a location sharing session with Anna.

Figure 7C:
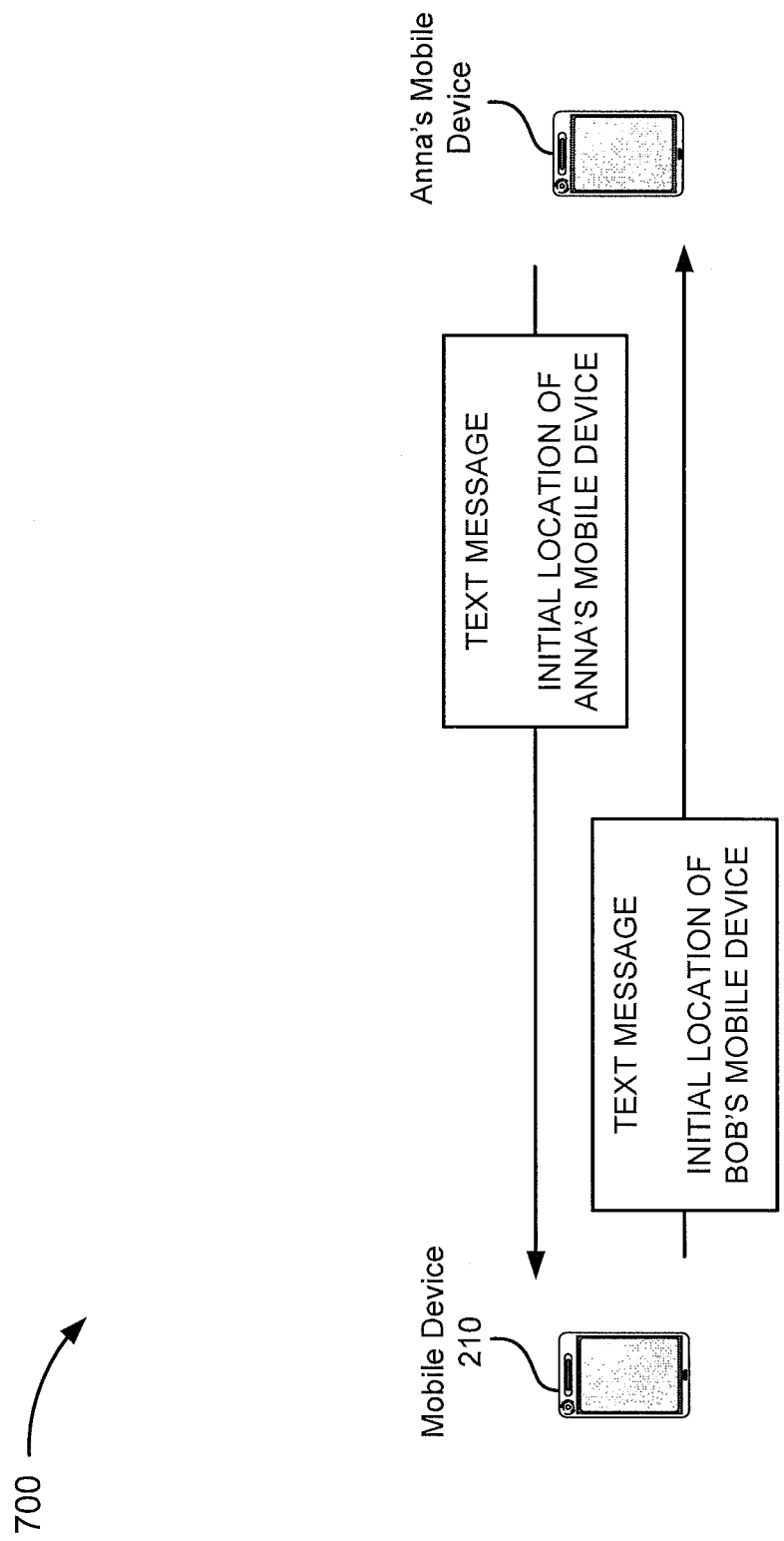

Referring now to FIG. 7C, assume that, based on Bob's selection of the icon, location sharing application 215 accesses preference information associated with Bob and determines that the preference information indicates that location information is to be shared for 15 minutes. Assume that location sharing application 215 initiates the location sharing session between Bob and Anna and starts a timer for determining when the location sharing session should be terminated. As shown in FIG. 7C, location sharing application 215 may determine and send, via the text messaging application, a text message that includes information identifying an initial location of mobile device 210 to Anna's mobile device (e.g., an initial location message). Additionally, mobile device 210 may receive a text message that includes information identifying an initial location of Anna's mobile device from Anna's mobile device. Mobile device 210 may generate a graphical representation depicting the initial location of mobile device 210 and the initial location of Anna's mobile device.

Figure 7D:
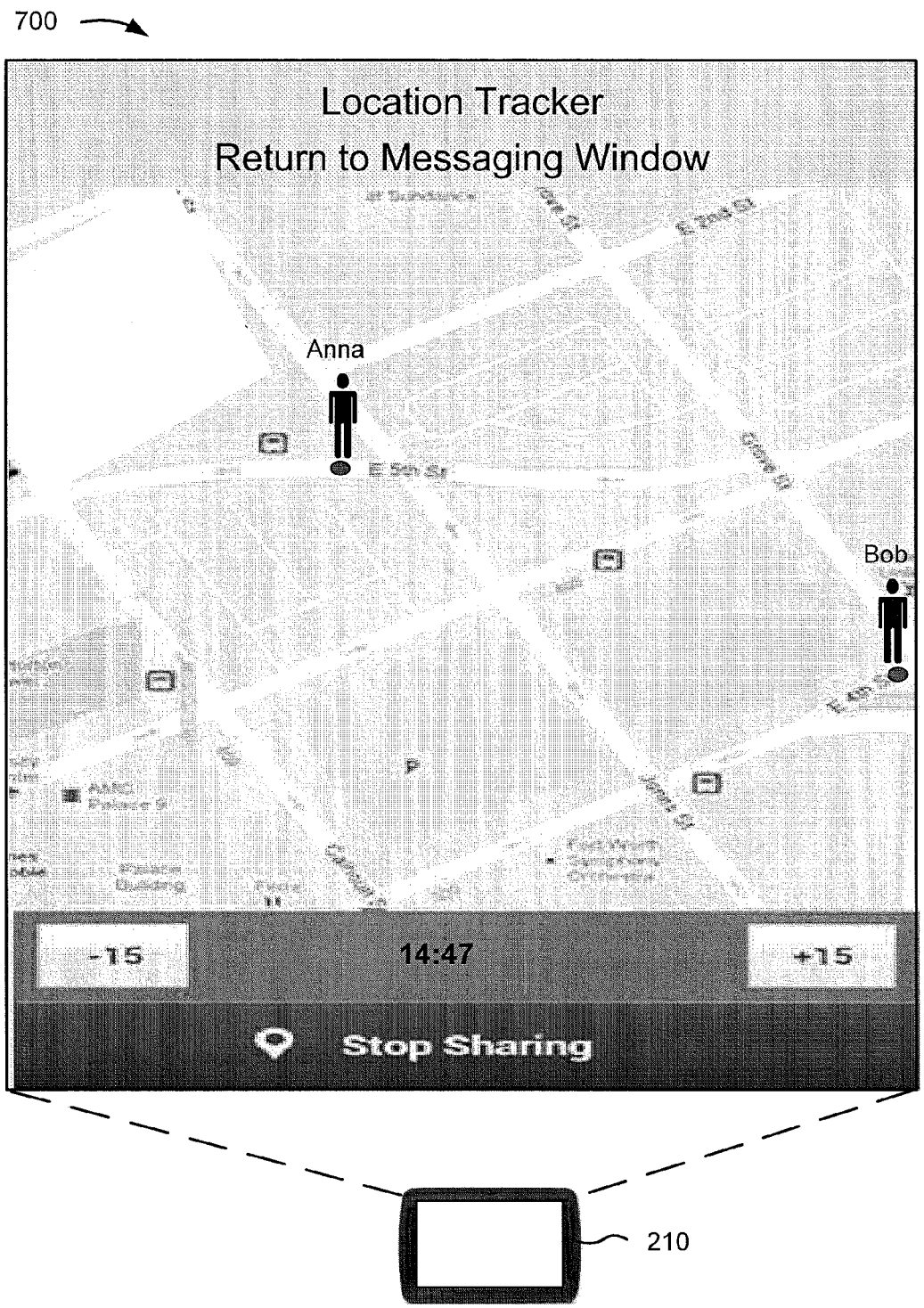

Referring now to FIG. 7D, mobile device 210 may cause the graphical representation to be displayed on a map. As shown in FIG. 7D, the graphical representation includes an icon (e.g., message banner) that the Bob can select to return to messaging window to continue exchanging text messages with Anna. The graphical representation also includes information indicating that the location sharing session will be terminated in 14 minutes and 47 seconds as well as icons that Bob can select to increase or decrease the amount of time remaining before the location sharing session is terminated.

Figure 7E:
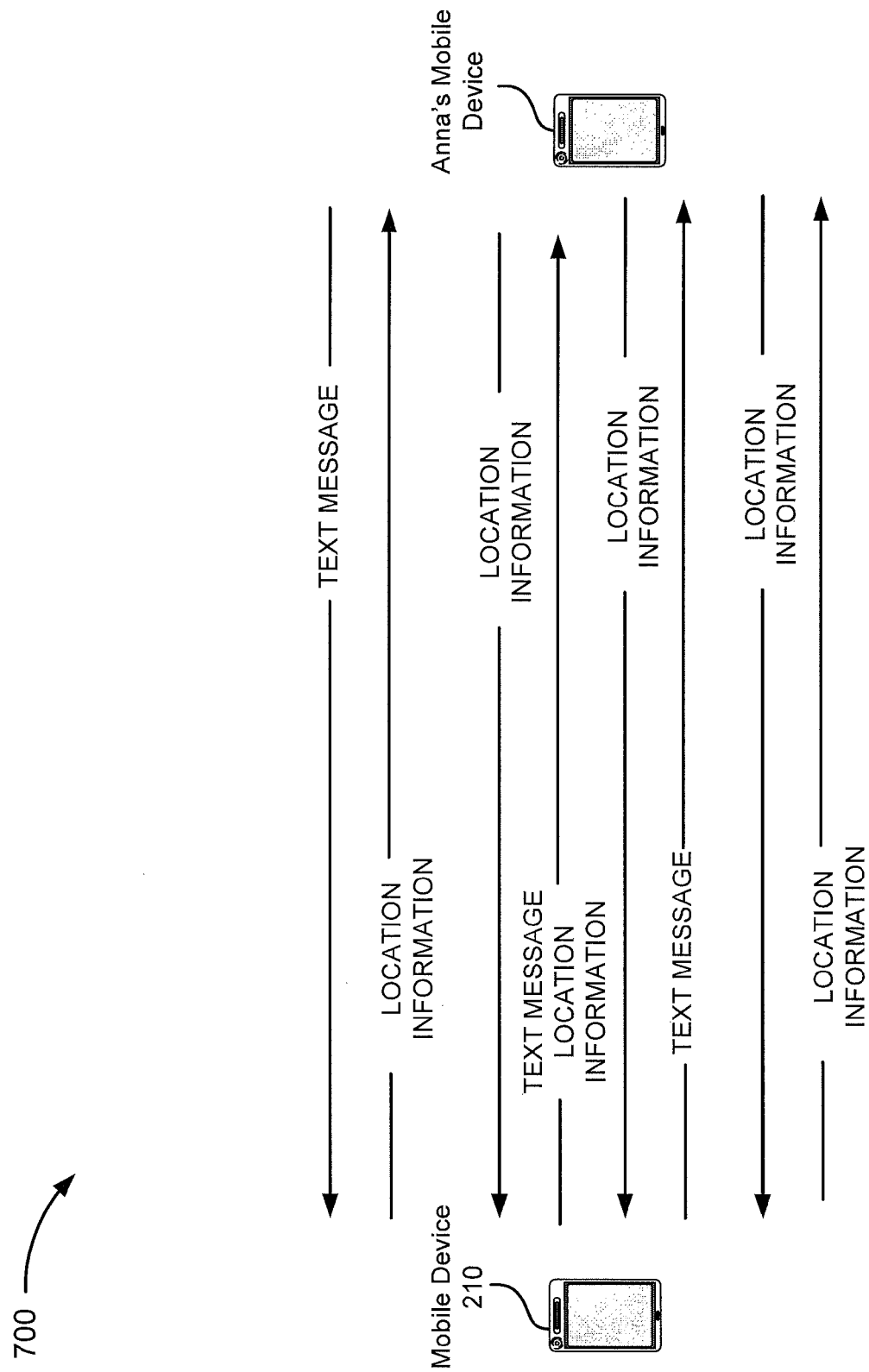
Figure 7F:
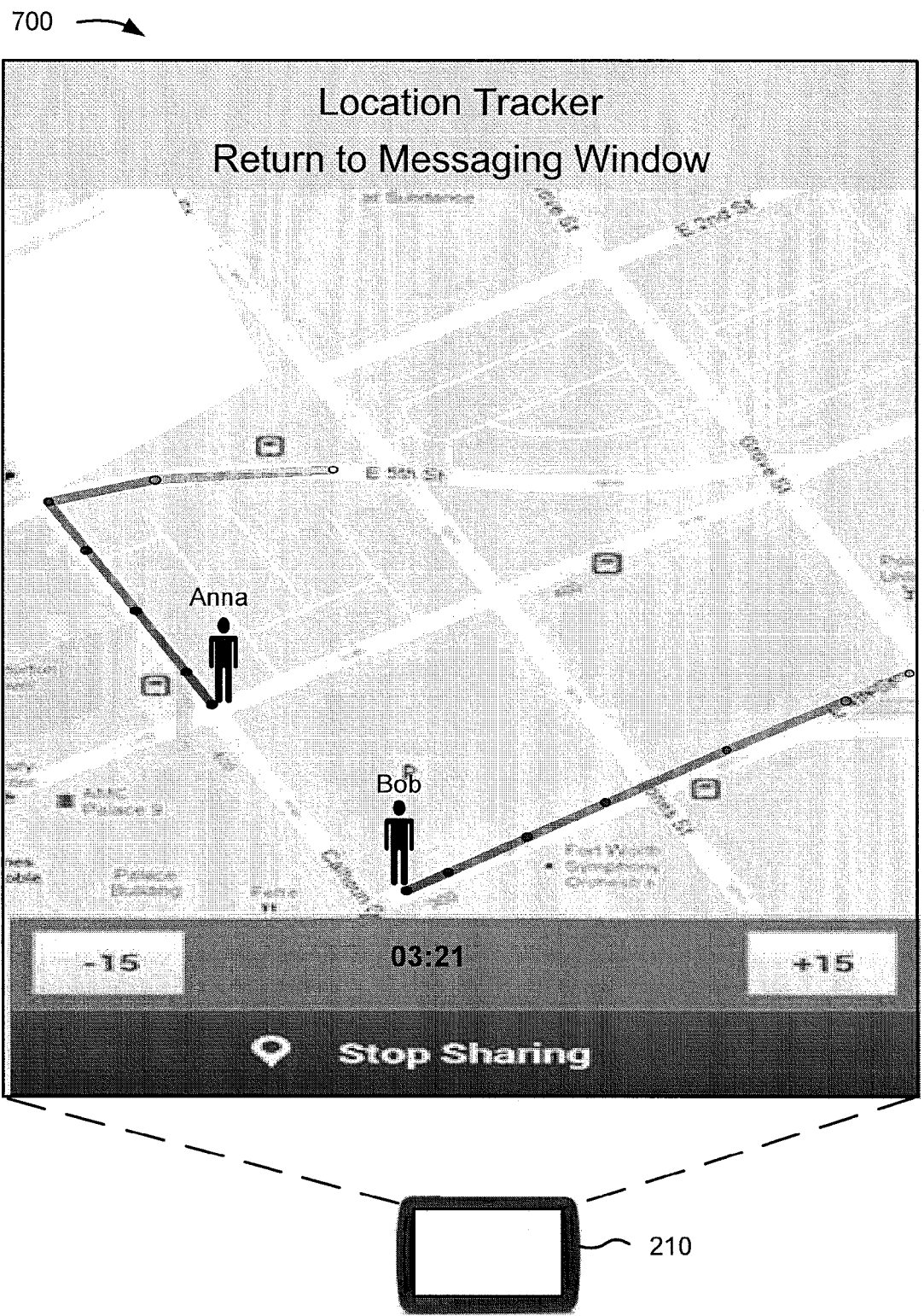

Referring now to FIG. 7E, as Bob and Anna travel to the movie theater, they may continue to exchange text messages. Additionally, mobile device 210 and Anna's mobile device may determine and share updated location information. Referring now to FIG. 7F, location sharing application 215 may generate an updated graphical representation based on the shared location information. The updated graphical representation may represent Bob and Anna's movement toward the movie theater as comet trails representing a speed and a direction of travel of Bob and Anna, respectively. The comet trails may allow Bob to quickly and easily see Anna's progress as Anna travels to the movie theater.

As indicated above, FIGS. 7A-7F are provided merely as an example. Other examples are possible and may differ from what was described with regard to FIGS. 7A-7F.

The foregoing description provides illustration and description, but is not intended to be exhaustive or to limit the embodiments to the precise form disclosed. Modifications and variations are possible in light of the above teachings or may be acquired from practice of the implementations. For example, while the above description focused on providing location information for mobile devices engaged in an exchange of text messages, implementations, described herein, are equally applicable to tracking location information for a group of mobile engaged in any type of group communication.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
   one or more instructions that, when executed by a processor of a first mobile device, cause the processor to:
      receive, via a text messaging application, a plurality of text messages from a second mobile device,
         each text message, of the plurality of text messages, including different location information associated with the second mobile device,
         the plurality of text messages including a first text message;
      generate, based on the location information included in the plurality of text messages, a graphical representation,
         the graphical representation representing a speed and a direction associated with a movement of the second mobile device;
      provide the graphical representation for display via a display associated with the first mobile device;
      provide a user interface associated with the text messaging application;
      generate, based on information received from a first user and via the user interface, a second text message,
         the received information indicating a second user for receiving the second text message,
         the second user being associated with the second mobile device;
      send the second text message to the second mobile device;
      display, based on sending the second text message, the information received from the first user via the user interface,
      the location information included in the first text message not being displayed via the user interface; and
      send, to the second mobile device, a third text message including information identifying a geographic location of the first mobile device,
         the third text message being sent based on the first mobile device being a particular geographic distance from a previous geographic location of the first mobile device,
            information identifying the previous geographic location being included in a fourth text message sent to the second mobile device, and
            the fourth text message being sent to the second mobile device prior to the third text message being sent to the second mobile device.

2. The non-transitory computer-readable medium of claim 1, where
   the third text message being sent based on one or more of:
   a predetermined time interval, or
   the first mobile device being a particular geographic distance from a previous geographic location of the first mobile device.

3. The non-transitory computer-readable medium of claim 1, where the one or more instructions to generate the graphical representation cause the processor to:
   modify, based on the location information, the graphical representation to generate a comet trail,
      the comet trail representing the direction associated with the movement of the second mobile device; and where the one or more instructions to provide the graphical representation for display cause the processor to:
provide the comet trail for display via the display associated with the first mobile device.

4. The non-transitory computer-readable medium of claim 3, where the comet trail comprises a first comet trail and the instructions further comprise:
one or more instructions that, when executed by the processor, cause the processor to:
determine a first geographic location of the first mobile device, and
determine a second geographic location of the first mobile device,
where the one or more instructions to generate the graphical representation cause the processor to:
generate a second graphical representation representing the first geographic location of the first mobile device,
modify, based on the second geographic location of the first mobile device, the second graphical representation to generate a second comet trail,
the second comet trail representing a direction of a movement of the first mobile device from the first geographic location to the second geographic location, and
where the one or more instructions to provide the graphical representation for display cause the processor to:
provide the second comet trail for display via the display associated with the first mobile device.

5. The non-transitory computer-readable medium of claim 1, where the one or more instructions to generate the graphical representation cause the processor to:
generate a comet trail representing the speed and the direction associated with the movement of the second mobile device,
the comet trail including:
a first marker corresponding to a first geographic location of the second mobile device, and
a second marker corresponding to a second geographic location of the second mobile device.

6. The non-transitory computer-readable medium of claim 5, where the one or more instructions to generate the comet trail cause the processor to:
determine an image associated with the second user of the second mobile device, and
generate the comet trail to include the image associated with the second user of the second mobile device.

7. A method comprising:
receiving, by a first mobile device, a plurality of text messages from a second mobile device,
each text message, of the plurality of text messages, including different location information associated with the second mobile device,
the plurality of text messages including a first text message;
generating, by the first mobile device and based on the location information included in the plurality of text messages, a graphical representation,
the graphical representation representing a speed and a direction associated with a movement of the second mobile device;
displaying, by the first mobile device, the graphical representation via a display associated with the first mobile device;
providing, by the first mobile device, a user interface;
generating, by the first mobile device, based on information received from a first user, and via the user interface, a second text message,
the received information indicating a second user for receiving the second text message,
the second user being associated with the second mobile device;
sending, by the first mobile device, the second text message to the second mobile device;
displaying, by the first mobile device and based on sending the second text message, the information received from the first user via the user interface,
the location information included in the first text message not being displayed via the user interface;
initiating, by the first mobile device, a session for sharing the location information with the second mobile device;
determining, by the first mobile device and based on initiating the session, an initial geographic location of the first mobile device; and
sending a third text message to the second mobile device,
the third text message including information identifying the initial geographic location of the first mobile device,
the third text message being sent based on the first mobile device being a particular geographic distance from a previous geographic location of the first mobile device,
information identifying the previous geographic location being included in a fourth text message sent to the second mobile device, and
the fourth text message being sent to the second mobile device prior to the third text message being sent to the second mobile device.

8. The method of claim 7, where receiving the plurality of text messages includes:
receiving the plurality of text messages via a text messaging application associated with the first mobile device.

9. The method of claim 7, where generating the graphical representation includes:
modifying, based on the location information, the graphical representation to generate a comet trail,
the comet trail representing the direction associated with the movement of the second mobile device; and
where displaying the graphical representation includes:
displaying the comet trail via the display.

10. The method of claim 7, where generating the graphical representation includes:
generating a comet trail representing the movement of the second mobile device,
the comet trail including a group of markers representing the speed associated with the movement of the second mobile device.

11. The method of claim 7, further comprising:
determining a movement of the first mobile device from a first geographic location to a second geographic location;
where generating the graphical representation includes:
generating a first comet trail representing the movement of the first mobile device; and
generating a second comet trail representing the movement of the second mobile device; and
where displaying the graphical representation includes:
displaying the first comet trail and the second comet trail via the display.

12. The method of claim 7, further comprising:
providing a second user interface for exchanging text messages with the second mobile device,
the second user interface including information identifying an application for sharing the location information with the second mobile device, receiving a selection of the information identifying the application;
initiating, based on the selection, a session for sharing the location information with the second mobile device;
determining, based on initiating the session, an initial geographic location of the first mobile device; and
sending a third text message to the second mobile device,
the third text message including information identifying the initial geographic location of the first mobile device; and
where the first text message is received from the second mobile device based on sending the information identifying the initial geographic location of the first mobile device.

13. The method of claim 12, where initiating the session includes:
initiating the session for a particular amount of time; and
where the method further comprises:
determining an expiration of the particular amount of time; and
terminating the session based on the expiration of the particular amount of time.

14. A device comprising:
a processor to:
receive a selection of a text messaging application;
receive, via the text messaging application and from a mobile device, a plurality of text messages,
each text message, of the plurality of text messages, including different location information associated with the mobile device,
the plurality of text messages including a first text message;
generate, based on the location information included in the plurality of text messages, a graphical representation representing a speed and a direction associated with a movement of the mobile device;
display the graphical representation via a display of the device;
provide, based on the selection, a user interface associated with the text messaging application;
generate, based on information received from a first user and via the user interface, a second text message,
the received information indicating a second user for receiving the second text message,
the second user being associated with the mobile device;
send the second text message to the mobile device;
display, based on sending the second text message, the information received from the first user via the user interface,
the location information included in the plurality of text messages not being displayed via the user interface; and
send, to the mobile device, a third text message including information identifying a geographic location of the device,
the third text message being sent based on the device being a particular geographic distance from a previous geographic location of the device
information identifying the previous geographic location being included in a fourth text message sent to the mobile device, and
the fourth text message being sent to the mobile device prior to the third text message being sent to the mobile device.

15. The device of claim 14, where, when sending the second text message, the processor is to:
determine location information associated with the device, and
attach information identifying the location information associated with the device to the second text message.

16. The device of claim 14, where, when generating the graphical representation, the processor is to:
determine, based on the location information included in the plurality of text messages, a group of locations associated with the mobile device, and
generate a comet trail including a series of markers,
the series of markers corresponding to the group of locations associated with the movement of the mobile device; and
where, when displaying the graphical representation, the processor is to:
display the comet trail including the series of markers via the display.

17. The device of claim 16, where the group of locations includes a current location of the mobile device and one or more previous locations of the mobile device, and
where, when generating the comet trail, the processor is to:
generate the comet trail including a head portion and a body portion,
the head portion including a first marker, of the series of markers,
corresponding to the current location, and
the body portion including one or more second markers, of the series of markers, corresponding to the one or more previous locations.

18. The device of claim 16, where a spacing of the series of markers within the comet trail is proportional to the speed associated with the movement of the mobile device.

19. The device of claim 14, where the processor is further to:
access preference information associated with the first user,
the preference information indicating a preference of the first user to share location information with the second user associated with the mobile device;
initiate a location sharing session based on the preference of the first user; and
where, when generating the graphical representation, the processor is to:
generate the graphical representation based on initiating the location sharing session.

20. The device of claim 14, where, when generating the graphical representation, the processor is to:
generate a comet trail representing the speed and the direction associated with the movement of the mobile device,
the comet trail including:
a first marker corresponding to a first geographic location of the mobile device, and
a second marker corresponding to a second geographic location of the mobile device.

* * * * *